Z. BLANCHET.
Hoisting System.
No. 235,121.
3 Sheets—Sheet 1.
Patented Dec. 7, 1880.
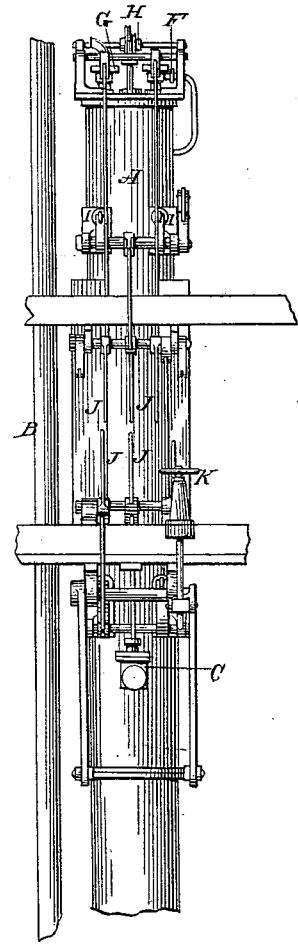
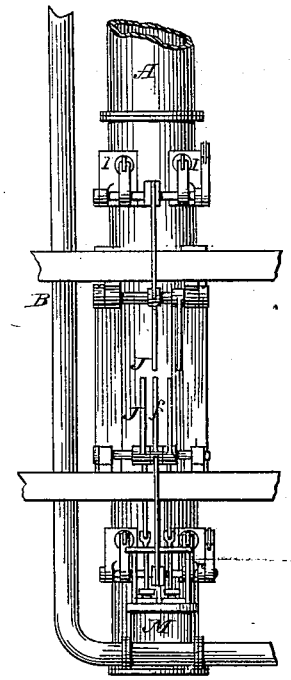
Fig. 1.

Z. BLANCHET.
Hoisting System.
No. 235,121.
3 Sheets—Sheet 2.
Patented Dec. 7, 1880.
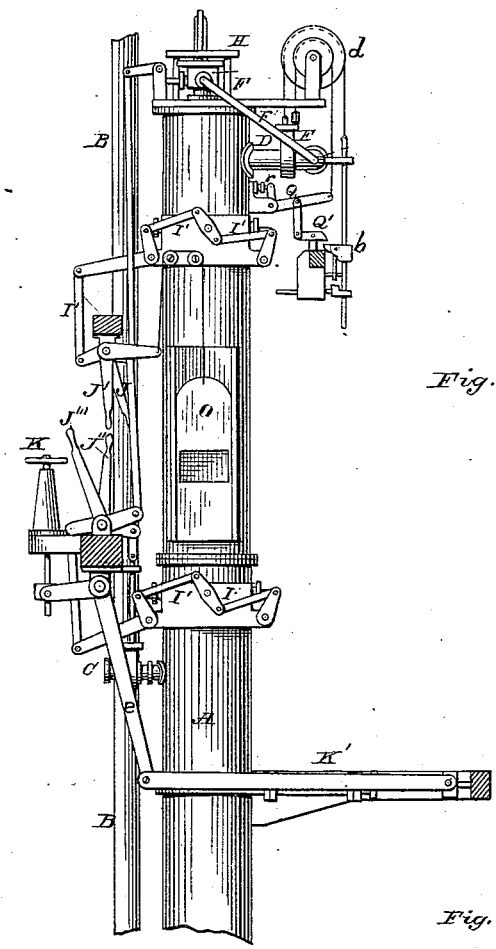
Fig. 2.
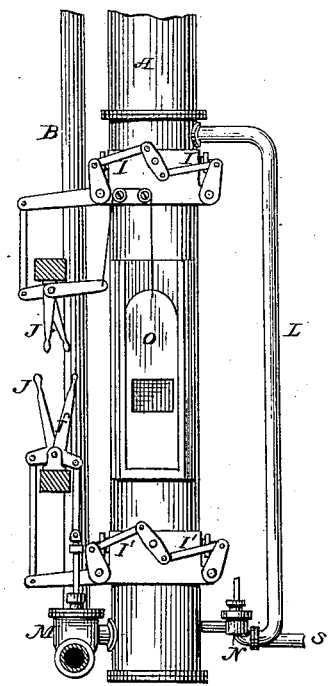
Fig. 4.
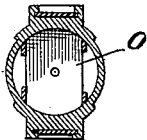
Attest:
O. Clarence Poole
R. F. Barnes
Inventor:
Zulma Blanchet
by his attys,
A. N. Evans & Co.

Z. BLANCHET.
Hoisting System.
No. 235,121. Patented Dec. 7, 1880.
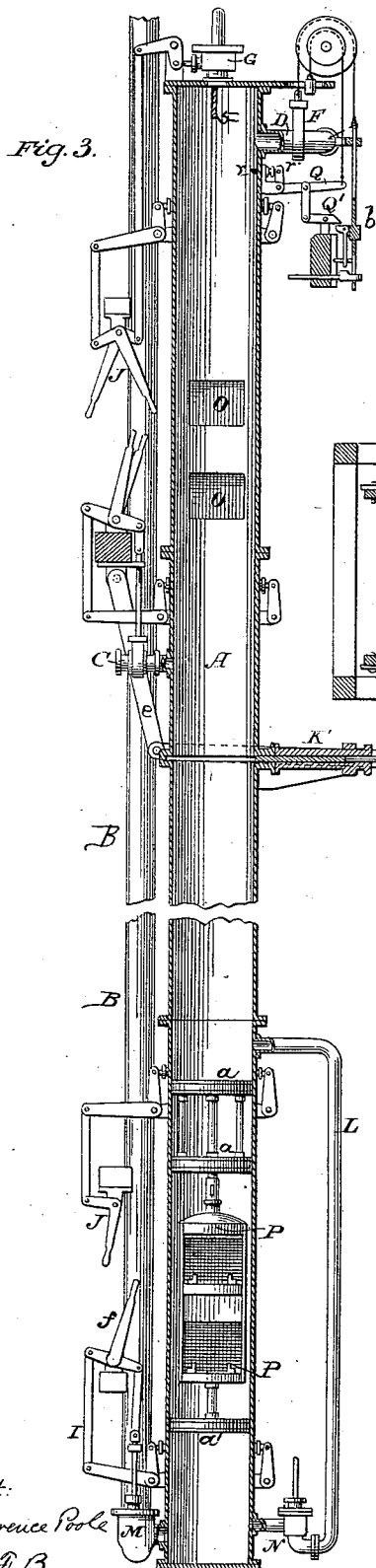
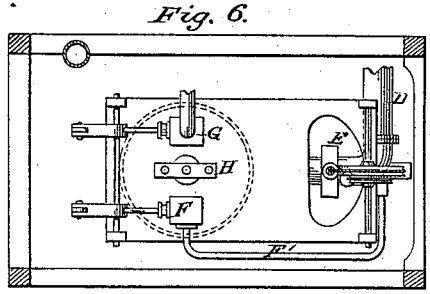
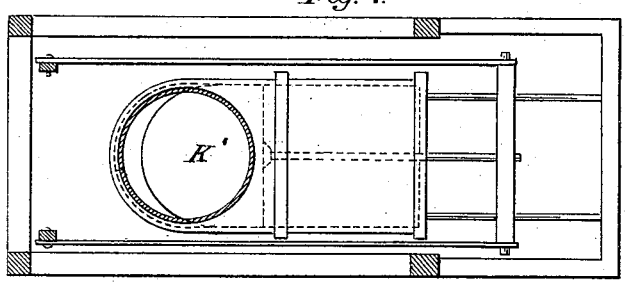
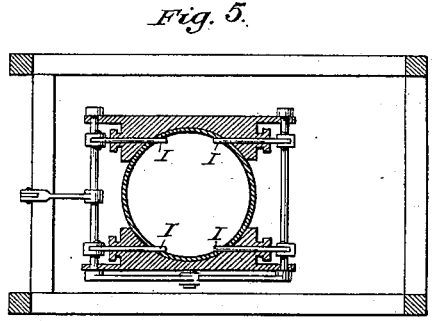

UNITED STATES PATENT OFFICE.

ZULMA BLANCHET, OF EPINAC, FRANCE, ASSIGNOR TO PRESCOTT, SCOTT & CO., OF SAN FRANCISCO, CALIFORNIA.

HOISTING SYSTEM.

SPECIFICATION forming part of Letters Patent No. 235,121, dated December 7, 1880.

Application filed June 21, 1879. Patented in France November 21, 1876.

*To all whom it may concern:*

Be it known that I, ZULMA BLANCHET, of Epinac, Department of Saone et Loire, France, have invented a new and Improved Hoisting System; and I hereby declare the following to be a full, clear, and exact description thereof.

My invention relates to certain improvements in that class of mining apparatus in which a cage is caused to move from one end of a closed tube by means of a vacuum or an air-pressure which is applied to move the cage by means of a piston which fits within the tube; and my invention consists in the application of such a tube to a vertical mining or other shaft and providing it with doors or openings at the various stations between the bottom and top. Within this tube a cage is supported between pistons which are connected with it above and below. A supplemental pipe extends from the bottom to the top of the shaft by the side of the main tube, and air is admitted from the mine to follow the piston and cage up the main tube, and is allowed to escape into the supplemental tube upon the descent of the cage, so as to assist in the ventilation of the mine. Suitable valves are connected with the lower part of the tubes for this purpose, and other valves connect the upper part of the main tube with an exhaust-engine, by which a vacuum is produced above the cage to elevate it. A system of levers and connecting-rods place these valves at the upper end within control of an engineer at this point, while the lower valves are in a similar manner placed within control of an engineer below.

My invention further consists of certain details of construction, which will be more fully described by reference to the accompanying drawings, in which—

Figure 1 is a front view of the apparatus, in two sections, showing the two tubes and the controlling-levers, connecting-rods, and the valve-chambers. Fig. 2 is a side elevation of the same. Fig. 3 is a vertical section of the main tube, showing the cage with pistons at each end and the operating-levers, rods, and the valve-chambers. Fig. 4 is a transverse section of the main tube, taken through the doors. Fig. 5 is a transverse section, showing the arrangement and operation of the catches for supporting the cage at its points of rest. Fig. 6 is a plan view of the top cover or platform above the tube, showing the relative position of valve-chambers at the top. Fig. 7 is a transverse section of the main tube, showing the large valve or gate K'.

A is a tube of any desirable shape, size, and material, placed in the shaft of a mine, and having openings with doors at stations O, where it is necessary to introduce and remove material.

P is a cage with tracks, as shown, so that when the cars arrive they may be run directly into the cage to be raised or lowered. $a\ a'$ are pistons above and below the cage, and connected to move with it, and they also protect the occupants of the cage from the effects of the vacuum above or the compressed air below. The lower pistons also support the cage upon the compressed air between it and the large cut-off valve K' when the latter is closed.

The interior surface of the tube is made sufficiently smooth and even to allow the piston to be actuated by atmospheric pressure and move throughout its length.

B is a supplemental tube, extending from top to bottom of the mine beside the main tube, and connected with a valve-chest, M, at the bottom, which also connects with the tube A, and with the surrounding air of the mine. When the cage and piston move up to the top of the tube A the air of the mine is admitted through the chest M and follows it up. When the cage descends the valves in the chest M are so changed as to allow the air from the tube A to be forced out and up through the tube B to the surface, and by this means the operation of raising and lowering the cage serves to pump some of the air out of the mine, so that its place may be supplied with fresh air, and the ventilation of the mine is thus aided.

I have shown the valve-chest M at the bottom and point of junction between the pipes, and it will be manifest that any form of valves may be employed which will first connect the tube A with the air surrounding it at the bottom, and will then close the communication with the extension and connect the two tubes directly.

Dogs or catches I are projected into the tube below the cage, at points where it is to rest, to prevent its falling. I have shown four at each station, and these are operated by rocker arms and shafts and by connecting-rods I', which are actuated simultaneously when the lever J is moved.

The lever J' opens and closes the door O, and the levers J'' and J''' serve to open and close the valves at C, F, and G.

D is a pipe, which connects the upper end of the tube A with the ingress-valves of a vacuum-engine, by which the air is sufficiently exhausted from the tube A above the cage to cause the latter to rise.

Within the chest E is a valve, which may be opened or closed to open or close communication between the tube A and the vacuum-engine. This valve, which is weighted, is closed automatically by the cage when it has reached the proper height by means of a bell-crank lever, Q, which is moved by a plunger or bolt, $r$, which extends into the cylinder, so that the cage or upper piston will strike it. This bell-crank lever moves an arm at Q', which is a detent for a lug, $b$, which is on a rod attached to a cord sustaining said valve and passing over a pulley, $d$. When rod Q' moves the lug $b$ is released and the valve falls.

In the chest H is a safety-valve, which is opened by the cage striking rod 5, to allow the air confined above the exhaust-pipe to escape if the cage should rise too high.

K' is a large valve extending across and entirely closing the tube A below the upper station, and this valve or gate is controlled by the engineer at the top by means of the hand-wheel K and screw and the lever $e$. This gate cuts off communication between the lower part of the tube and the space just below the cage when the latter is at the top. The elasticity of the air between the cage and this gate partly supports the cage and aids in working it at this point. It would also prevent accident to the cage if the catches should not hold.

The valve in the chamber M is moved by a lever, $f$, which is within control of the lower engineer.

The pipe L opens into the tube A at a point near the bottom, and also at some point higher up, so that when the cage is within this space, and either ascending or descending, the engineer at the lower end will have control over it independent of the action of the engineer at the top. This is effected by means of a valve within the chest N, by which the interior of the tube A above and below the cage may be connected at will, or the communication may be entirely cut off.

The operation of my apparatus is as follows:
The cage being at the bottom of the tube and having received its load, the doors O at the lower end are closed by the engineer at that point. The valve in the chamber N is also made to close the pipe L, and the valve in the chest M is adjusted so as to open communication between the lower part of the tube A and the surrounding atmosphere and close communication with the tube B. The engineer below then signals the engineer at the top by any suitable means, and the latter immediately closes the doors O, if they are open, and also the valves in the chests C, F, and G, and opens the valve in the chest E, so that the main tube A is connected with the ingress-ports of an exhaust-engine (not shown) by means of the pipe D. The air is thus exhausted from the main tube above the cage, and the atmospheric pressure admitted from below through the valve at M drives the cage to the upper end of the tube. Small pipes (not here shown) lead from various points in the main tube or barometric gages, which are placed near each engineer, so that they can tell at a glance where the cage is and its rate of progression. In some cases bells are used, being connected with bolts which enter the tube and are moved by the passing piston. When it reaches the point where it is to be stopped—opposite the upper doors O—the engineer at the top closes the valve at E by any desired connection therewith and throws the dogs or catches I into position beneath the cage, so as to support it. The large gate or valve K' is then closed, so as to cut off the space just below the cage from the lower part of the tube. The doors O at the top are opened and the load may be removed.

When it is necessary to lower the cage the doors O are closed, the valve at C is opened, and the valve at F, which opens connection through the small pipe with the exhausting-engine, is also opened and the air sufficiently exhausted above the cage to raise it from the catches I, which are then withdrawn. The gate or valve K' is also withdrawn, and the valves at C and F being closed, the valve at G is opened to admit air. Before this is done the engineer below is notified, and he closes the valve at M, between the main tube and the outer air, and causes it to connect the main tube with the discharge-tube B. He also closes the doors O, if they are open, and all the catches are drawn back. When the cage arrives near the bottom, as will be indicated by the barometric gages or bells, and within the space inclosed by the pipe L, the engineer below controls its further movements by means of the valve in the chest N, by which the space above and below the cage may be connected, or the pipe L may be connected with the surrounding atmosphere through the pipe S. By closing the valve at M and using the valve at N it will be seen that the last portion of the descent of the cage may be controlled by the lower engineer independent of any action of the surface engineer, and whether the valve at G be closed or not.

During the first portion of the ascent of the cage, and while it is within the limit inclosed by the pipe L, it will be seen that its movement may be checked or stopped by the lower engineer by simply opening the valve in the chamber N, so that the pipe S will connect through the pipe L with the space above the cage, and the exhausting-engine of the engine above will be wholly or partly counteracted by the admission of air through these pipes into the main tube above the cage and piston.

Having thus described my invention, what I claim as new, and desire to secure by Letters Patent, is—

1. In a hoisting apparatus consisting of the tube A, having a cage moved upward within it by atmospheric pressure upon a piston or pistons secured to said cage, the mechanism consisting of the arm $r$ entering the tube, the bell-crank lever Q, arm Q', lug $b$, and connecting device, whereby the valve at E is automatically closed by the movement of the cage and piston, substantially as herein described.

2. In a hoisting apparatus consisting of the tube A, within which a cage is raised by atmospheric pressure, as shown, the supplemental valve within the chest F and the pipe F' connecting it with the main exhaust-pipe D, whereby the cage may be raised to release the supporting-catches without opening the main valve, substantially as described.

3. In a hoisting apparatus operating by atmospheric pressure, as shown, the exhaust-pipe D, main and supplemental valves in the chests E and F, and the ingress-valve G, to remove the pressure and allow the cage to descend, in combination with the levers J''' and connecting-rods, whereby the valves may be opened or closed, substantially as herein described.

4. In an atmospheric-pressure hoisting apparatus having a cage and piston operated as shown, the supporting catches or dogs I, rock-shaft arms, and connecting-rods I', in combination with the levers J, whereby the catches are moved forward or retracted, substantially as herein described.

5. In a hoisting apparatus consisting of the tube A, with its cage or piston adapted to be elevated by atmospheric pressure, the discharge-pipe B and the valve within the chest M, operated by a lever, as shown, so that the air from the exterior may act to elevate the piston and cage, and this air may be discharged at the surface through the pipe B by the descent of the cage, substantially as herein described.

6. The tube A, having the cage P, adapted to move upward within the tube by atmospheric pressure, in combination with the pistons $a$ $a'$, attached above and below the cage, so that the action of the vacuum above or the compression below will be cut off from the cage and the door openings, substantially as herein described.

In witness whereof I have hereunto set my hand and seal.

Z. BLANCHET. [L. S.]

Witnesses:
 JUIDÉ,
 MARIANNET.